July 10, 1934.   R. A. MORSE   1,965,709
COMBINATION ANTIROLL BACK AND FREEWHEELING DEVICE
Filed Oct. 12, 1931   3 Sheets-Sheet 1

INVENTOR.
R. A. Morse,
BY John M. Spellman
ATTORNEY.

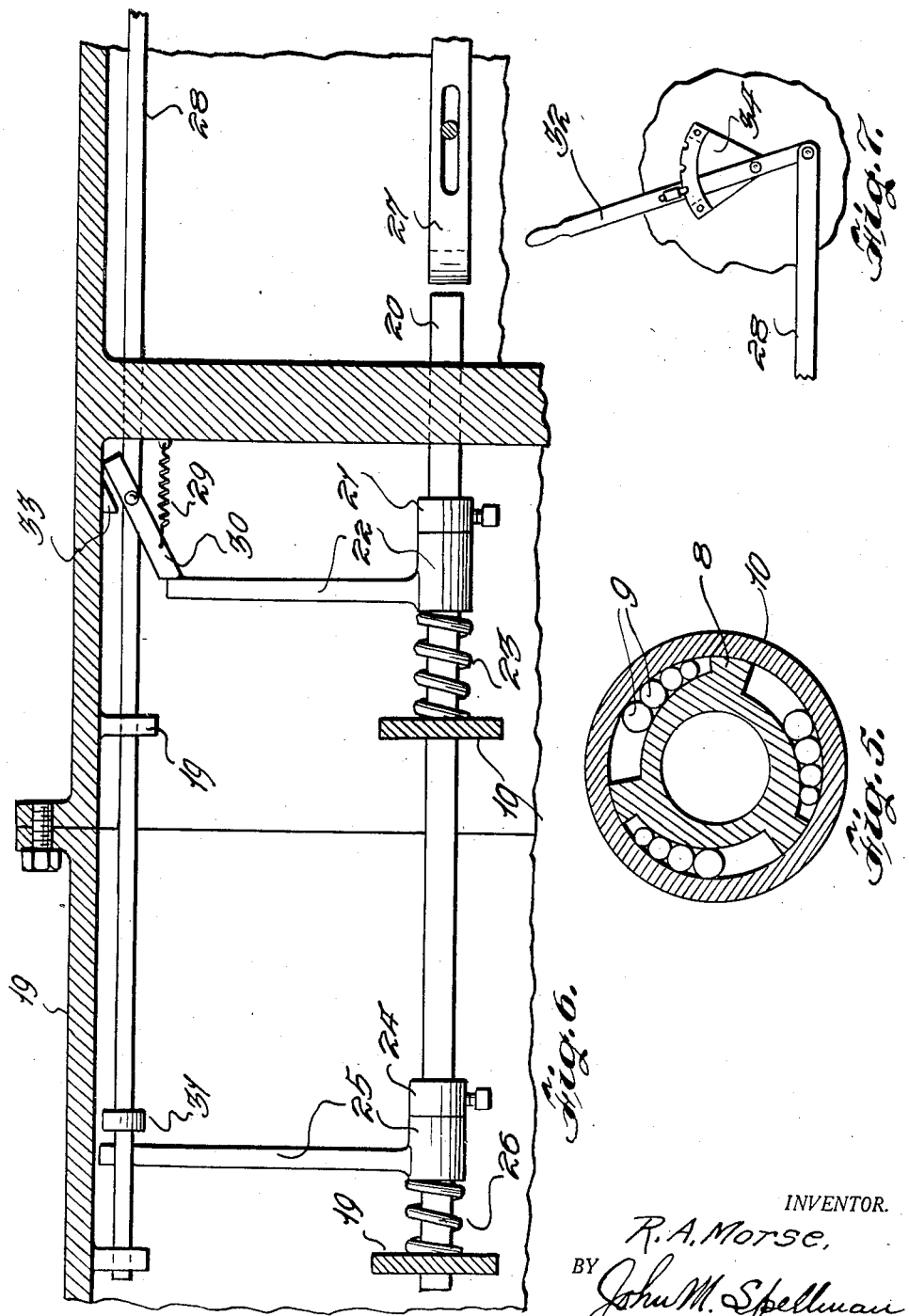

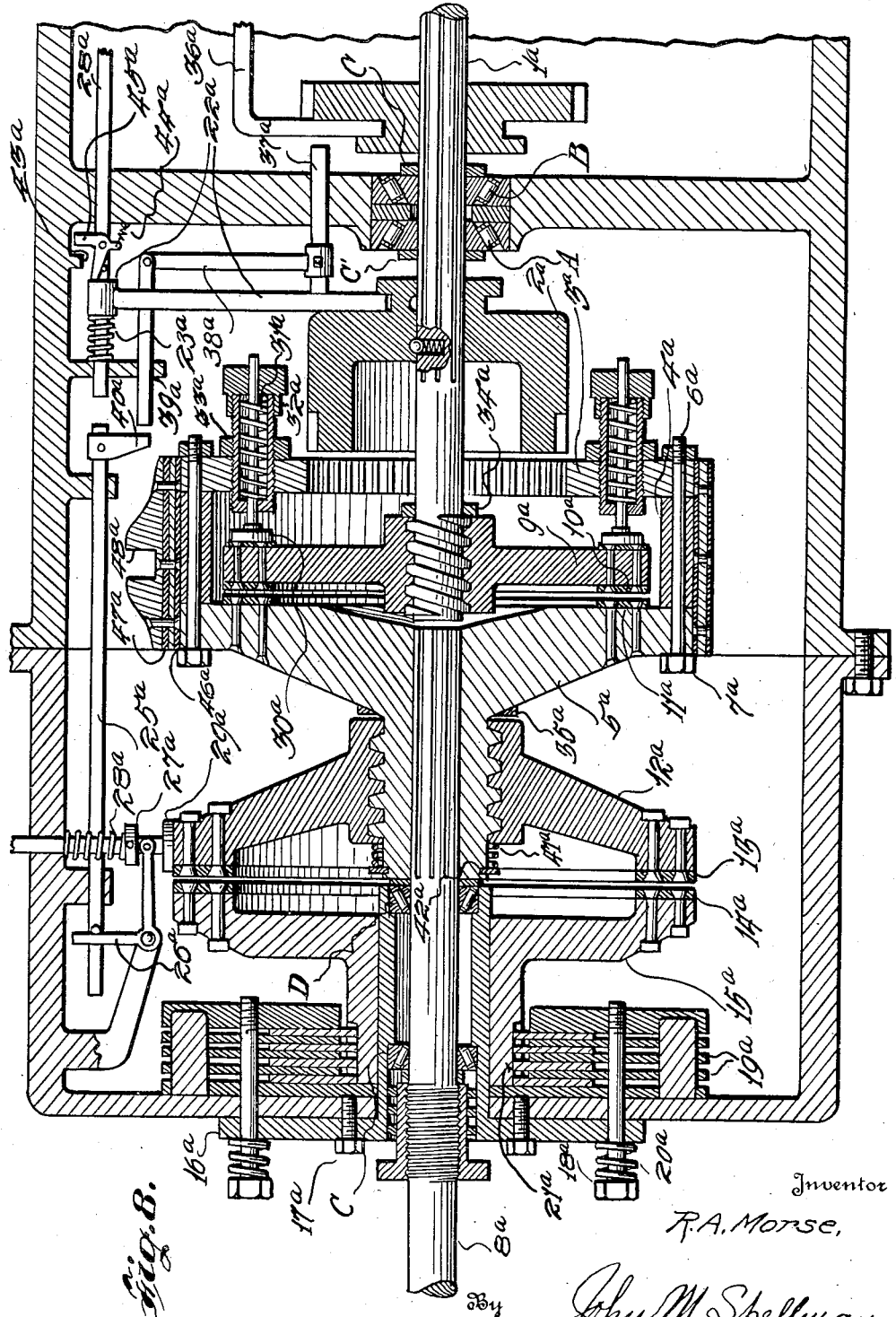

Patented July 10, 1934

1,965,709

UNITED STATES PATENT OFFICE 1,965,709

COMBINATION ANTIROLL BACK AND FREEWHEELING DEVICE

Raymond A. Morse, Linden, Tex.

Application October 12, 1931, Serial No. 568,409

15 Claims. (Cl. 192—4)

This invention relates to free-wheeling devices for motor vehicles, and the principal object of the invention is to provide a combination anti-roll-back and free-wheeling device.

More particularly defined the invention seeks to provide a novel arrangement and assemblage of parts whereby the free-wheeling feature is combined with the anti-roll-back feature and provides free-wheeling for the vehicle and at the same time automatically prevents the vehicle from back-roll such as at inclines at a street signal "stop" sign, on up-grades, and the like. The combination also enables the driver to "free-wheel" on all forward gears, rendering it unnecessary to de-clutch to shift to any forward gear once the vehicle is in forward motion.

Another object of the invention in this connection is that the device is selective in that free-wheeling may be locked out at the desire of the driver by the operation of a control mechanism disposed on the dash or instrument board of the vehicle, likewise the anti-roll-back feature may be locked out and free wheeling used alone.

A further and important feature of the invention is that the anti-roll-back provides for safety to the working parts of the vehicle in that while the anti-roll-back device is in locked position it may be made to release without being unlocked, thus preventing damage to the vehicle.

The combination anti-roll-back and free-wheeling device may also be operated as a locked free-wheeling or positive gear control with free-wheeling unit locked out and the anti-roll-back mechanism inoperative, permitting the vehicle to be propelled by its own power when gear shift lever is placed in reverse gear position.

The above and other objects of the invention will be clearly understood from a perusal of the following detailed description, taken in connection with the accompanying drawings and wherein:

Figure 1 represents a vertical sectional view through the unit case or housing of a free-wheeling unit of a motor vehicle and illustrating therein an embodiment of the invention, in part.

Figure 2 represents a vertical sectional view of one of the free-wheeling units.

Figure 3 represents a face view of a gear which co-acts with the unit shown in Figure 2.

Figure 4 represents a cross-sectional view through one of the free-wheeling units, Figure 5 being a similar view but showing the unit designed to operate as the anti-roll-back.

Figure 6 represents a partial horizontal sectional view of Figure 1, the view being had on the line 6—6 of Figure 1.

Figure 7 represents a side elevational view of the control lever.

Figure 8 represents a sectional view similar to Figure 1, but showing a modification.

Proceeding in accordance with the drawings wherein like parts bear like characters of reference, 1 indicates the main driving shaft projecting through the rear end of transmission casing and into the front end 19 of free-wheeling unit casing, embodying the anti-roll-back device. This shaft 1 has splines cut into it and the positive locking gear 2 is splined to the shaft 1, with sufficient clearance to permit it to slide on the shaft 1 and into the gear 3, carried on the unit 6, when shift fork 22 is operated. The core 4 which is the driving member of the free-wheeling unit is splined to the shaft 1 and remains stationary on shaft 1. The rollers 5 are for the purpose of locking the core 4 to the driven member of the unit 6, which member 6 is splined stationary to the rear drive shaft 7. The rollers 5 thus operate to connect and disconnect the members 6 and 4. Member 6 has a true inner circumference and the member 4 is formed of a series of inclined planes, and the combined parts operate as an over-running clutch which locks shaft 1 to member 6 when the speed or normal clock-wise rotation of shaft 1 equals or tends to exceed the speed of rotation of shaft 7 and member 6.

In practice, when the speed of rotation of shaft 7 and member 6 exceeds the speed of rotation, in a clock-wise direction, of shaft 1 and member 4, the rollers 5 disconnect the members 6 and 4, allowing the shaft 7 and member 6 to continue rotation and member 4 and the shaft 1 to stop or to rotate at a lower rate of speed. This locking or unlocking of the over-running clutch parts is automatic, and the operation thereof is well-known and forms no part of the invention by itself. This over-running clutch mechanism or free-wheeling unit with core 4 rollers 5 and member 6 is installed on the shaft 1 in ordinary over-running clutch or free-wheeling position common to mechanisms of this sort.

In Figure 5 is illustrated another over-running clutch so designed and arranged as to operate as the anti-roll-back feature of the invention, that is, it is in the unlocked position when the shaft 7 rotates in a clock-wise direction so as to propel the vehicle forward, and locks when this shaft is rotated in the opposite direction, that is anti-clock-wise, thereby preventing the vehicle from rolling backward. The over-running clutch which constitutes the principal feature of the anti-roll-back feature consists of the member 8 or driving member, splined stationary to the shaft 7, the locking rollers 9 which lock the member 8 and shaft 7 to the driven member 10, the latter being the driven member of the over-running clutch. The over-running clutch indicated by the parts 8, 9 and 10 is identical as the former over-running clutch described, except that it has teeth 11 cut on its periphery to provide a gear. Also while member 6 of the unit shown in Figure 4 is splined stationary to shaft 7, the driven member 10 floats on the shaft 7 and is not fastened thereto, except when locking rollers 9 lock member 8, keyed to shaft 7, thereby locking this shaft.

A band gear 12 has teeth cut into its inner circumference and wide enough to cover the entire toothed circumference of the gear 11. This band is wide enough also to extend some distance on teeth which are cut in the outer circumference of a member 13, thereby locking member 13 and the gear 11 together. This member 13 forms a part of a multiple disk brake, and has splines cut on its outer circumference on the opposite end to that of the gear 11. This disk brake includes also the plates 13' and plates 15, and the outer plates 15 are anchored to unit case 19 by lugs on outer circumference of disk 15 fitting into grooves in case 19. The inner or smaller plates 13' have lugs on their inner circumference fitting into splined portion of the member 13.

The purpose of disk brake is to prevent injury to the working parts of the vehicle in case one vehicle, for instance, should roll or move backwardly into another when the device is in locked position. The friction or pressure exerted on the plates of the multiple disk brake depend upon the distance the brake spring studs 17 are screwed into the rear of the plates 15, thereby compressing the helical spring 18 to bring the plates together. This force may be made strong enough to prevent the brake from slipping on ordinary loads, but still enable the brake to slip sufficiently should an excessive load be imposed on the vehicle while the anti-back-roll device is in locked position. The helical coil spring 26 keeps the anti-roll-back device in operative position, unless the vehicle transmission is placed in the reverse position or the driver of the vehicle operates the shifting mechanism as illustrated in Figures 6 and 7. Either of these operations disconnects the anti-roll-back device. The helical coil spring 23 keeps the positive locking gear 2 out of mesh with gear 3 on member 5 and permits free wheeling. Free wheeling is locked out and positive gear 2 slid into positive gear locking position in mesh with gear 3 when vehicle transmission is placed in the reverse position, this being accomplished by reverse shifting fork and rod 27 on vehicle transmission engaging shift rod 20 pushing it to the rear and collar 21 being stationary on rod 20 moves shift fork 22 and gear 2 to rear, compressing spring 23.

In Figure 8 is shown a modification of the invention and illustrating a different form of over-running clutch or free-wheeling unit, but which is equally as practical and operable in the combination as that previously described. In the modified form, shaft 1a is the main drive shaft, protruding from engine and vehicle transmission and projecting into free-wheeling and anti-roll-back unit, supported by the two timkin bearings A and B, with collars C and C' fastened stationary on shaft 1a, to prevent shaft 1a slipping forward or backward. The gear 2a is splined to shaft 1a, and is movable fore and aft on shaft 1a, so as to mesh gear teeth cut on inner circumference of gear 2a with gear teeth cut on outer circumference of gear 3a. For positive gear lock, and to lock free-wheeling out, inoperative, gear 2a is meshed with gear 3a, by sliding gear 2a to the rear, and for free-wheeling gear 2a is in position shown in the drawing, Figure 8. In positive gear, free-wheeling inoperative, gear 2a is slid on splined shaft 1a toward the rear, engaging teeth on gear 2a with teeth on gear 3a. Gear 3a is fastened to part 4a, which is a ring sufficiently wide to form a housing when gear 3a, band or ring 4a and driven member 5a, are assembled and bolted together with bolts 6a and nuts 7a, completely enclosing the free-wheeling unit 9a, which is screwed onto shaft 1a and with sufficient clearance on threads to permit unit 9a to be screwed on shaft 1a with a slight pressure, rendering easy operation of free-wheeling, when free-wheeling is operating. Driven member 5a is keyed to shaft 8a, which is the main drive shaft coupled to differential. Thus when gear 2a and gear 3a are meshed, the two shafts 1a and 8a rotate as one and are positively coupled. To free-wheel, gear 2a is in the forward position as shown in drawing and is out of mesh with gear 3a. Free-wheeling unit 9a has threads cut into its hub and corresponding threads being cut into shaft 1a. Sufficient clearance is allowed between threads in unit 9a and on shaft 1a to permit 9a to be screwed onto or off of shaft 1a with ease. The threads in unit 9a and shaft 1a are left-hand threads, so that when unit 9a is held from non-rotation, and shaft 1a is rotated in a clockwise direction, as viewed from the front or engine-end, the unit 9a moves axially along shaft 1a to the left, or has a tendency to be screwed off of shaft 1a. The driven member 5a of the free-wheeling unit, being keyed to shaft 8a and not permitted to move in a fore-and-aft direction, offers resistance to the unit 9a, and by so doing the disc linings 10a and 11a which are united to the respective parts 9a and 5a are brought into contact with each other and firmly compressed as the shaft 1a tends to rotate clockwise or in a normal direction of rotation to propel the vehicle forward. When the compression of disc linings 10a and 11a is great enough, the shaft 1a ceases to screw out of unit 9a and shaft 1a and this unit rotate as one, and since the compression of 10a and 11a is great enough to prevent 10a slipping on 11a and 11a is riveted to driven member 5a, the parts comprising shaft 1a, unit 9a, linings 10a and 11a and the driven member 5a, all rotate in a clockwise direction. Driven member 5a being keyed onto shaft 8a, thus shaft 1a and shaft 8a are locked together and rotate clockwise as one. When the power is released and the shaft 1a slows down its speed of rotation in a clockwise direction or stops, the shaft 8a and driven member 5a continue to rotate in a clockwise direction, and the brake shoe 30a, being pressed against unit 9a, by the helical spring 31a (inside the tension adjusting screw 32a, which is held adjusted by locking nut 32a the latter held adjusted by locking nut 33a, jammed against the wall of gear 3a)—has a tendency to rotate unit 9a at same speed of shaft 8a. The unit 9a, gear 3a and ring 4a, thereby screwing unit 9a onto shaft 1a axially until the hub of unit 9a engages the collar 34a which is fastened stationary on shaft 1a and holds unit 9a against collar 34a by the brake action of shoe 30a, tending to rotate unit 9a clockwise, thus holding disc linings 10a and 11a apart, permitting free-wheeling. The moment the speed of rotation of shaft 1a exceeds the speed of rotation of shaft 8a and driven member 5a and parts 4a, 3a,—the unit 9a is screwed to the left, compressing linings 10a and 11a and locking the shaft 1a and shaft 8a.

The anti-roll-back unit consisting of the coupling 12a, screwing onto member 5a with right-hand threads, so that when member 5a and shaft 8a are rotated in a clockwise direction as viewed from the engine-end of vehicle, and coupling 12a is held by the brake shoe 29a, spring 28a and collar 27a, the coupling 12a is actuated or screwed axially along member 5a to the right and against shoulder 35a on member 5a and disengages the disc linings 13a and 14a and the driven member of anti-roll-back coupling, which is numbered 15a—thereby permitting the shaft 8a, member 5a and coupling 12a to rotate in a clockwise direction, normally, to propel the vehicle forward. When drive shaft 8a and member 5a tend to rotate in an anti-clockwise direction, which would permit the vehicle to roll backwardly, the coupling 12a is held by brake shoe so as not to rotate and member 5a turning anti-clockwise actuates or screws part or coupling 12a axially to the left and against member 15a, compressing disc linings 13a and 14a, which are riveted to coupling 12a and member 15 respectively. The result is the locking of member 5a and the coupling 12a to member 15a which is anchored to unit casing 24a through brake assembly. Member 15a has grooves or splines cut into its outer circumference on end opposite to disc lining and small brake plates 21a, having lugs on their inner circumference fitting into spline on member 15a. The outer brake disc or larger discs 19a have lugs on their outer circumference fitting into grooves in unit case 24a anchoring same to the casing. Bolts 18a screwed into large brake discs 19a compress helical springs 20a against casing, putting tension on the clutch. The member 15a is anchored to the unit casing 24a by brake and spring assembly, and is held stationary with casing 24a unless an overload is imposed on the anti-roll-back device which would cause multiple disc brake to slip, preventing breakage of part, or damage to propelling end of vehicle. Member 15a has a floating position on the shaft housing 16a containing roller bearings holding shaft 8a in alignment, and member 15a is anchored to unit casing 24a through multiple disc brake, bolts and spring assembly.

To propel the vehicle backward the vehicle transmission shift lever is placed in the reverse position. Shift fork 36a being reversing shift fork in vehicle transmission, engages shifting rod 37a which engages shift collar 22a and moves the gear 2a to rear, meshing with gear 3a and giving a positive gear lock. The arm and rod 38a and 39a engage the collar 40a and the rod 25a and move same to rear when shifting rod 37a is moved to rear by shift fork 36a. When the rod 25a is moved to the rear the pin in the rod 25a (where bell crank 26a fastens to rod 25a) comes into contact with bell crank 26a and operates bell crank, raising brake shoe 29a and collar 27a and compressing spring 28a thus allowing helical spring 41a to move member 12a axially along member 5a and against shoulder 35a, disengaging disc linings 13a and 14a and rendering the anti-roll-back unit inoperative. 42a is a collar stationary on 5a to assist 41a, moving 12a to the right. 43a is a bracket unlocking lug on unit case 24a and 44a is a bracket locking spring with 45a a bracket. 46a is an emergency brake band lining and 47a is an emergency brake band; 48a shows emergency brake band operating ears.

The disk brake for use on trucks may have the tension increased to the desired slipping point or tension studs 17 may be screwed into front plates 15 on the multiple disk assembly until the springs 18 are completely compressed, thus bolting brake disks 13' and 15 stationary with casing 19. The anti-roll-back device is very advantageous in preventing vehicles from rolling backward in event of insufficient power, faulty brakes and the like.

The control mechanism shown in Figures 6 and 7 enables the driver of the vehicle to operate the free-wheeling unit in various combinations. The first combination being with the control lever 32, Figure 7, in the position indicated, the control rod 28 being then in full forward position and the ratchet 30 not exerting any force on the shift fork 22, thereby permitting the spring 23 to hold shift fork 22 in this position, also holding positive locking gear 2 out of mesh with locking gear 3, thus permitting free-wheeling. In this position as shown in Figure 7, lever 32 in rear position, the stationary collar 31 on the control rod 28 is not in contact with shift fork 25, thereby allowing spring 26 to hold shift fork 25 forward and also gear 12 forward, thereby locking these parts, and transmitting load to unit case 19 when the anti-roll-back locks. In this position of the control lever the unit operates as a free-wheeling unit, with the anti-roll-back device operating, preventing vehicle rolling backwardly.

In the second position of lever 32, that is in the second notch of quadrant 34 to the right in Figure 7 of the drawings, the control rod 28 is moved to the rear until collar 31 is against shift fork 25, but has not moved fork 25, this allowing the anti-roll-back unit to remain operative. When lever 32 was moved to second notch from rear on quadrant 34, the control rod 28, together with the ratchet 29 and shift fork 22 is moved to rear, thereby meshing gear 2 inside of gear 3 and rendering free-wheeling inoperative. But in this position the roll-back device is operative and the result is positive gear lock without free-wheeling.

In the third case the lever 32 is moved forward to the third notch on the quadrant 34 to the right, Figure 7 of the drawings, and the control rod is moved still further to the rear and the ratchet 29 comes into contact with unlocking cam 33 on case 19, thereby disengaging shift fork 22, allowing spring 23 to move shift fork 22 and positive locking gear 2 forward disengaging locking gears 2 and 3. This permits free-wheeling. In the third position collar 31 has engaged shift fork 25 and moved same to rear, thereby sliding gear 12 off of gear 11 and rendering the anti-roll-back unit inoperative, thus providing free-wheeling, and with anti-roll-back inoperative.

In the fourth case the lever 32 is moved to the rear one notch after having been moved all the way forward on the quadrant. Thus lever 32 is placed in second notch on quadrant and allows control rod 28 to come forward sufficiently to allow spring 26 to move shift fork 24 forward, engaging gear 12 and gear 11, rendering the anti-roll-back device operative and the free-wheeling unit operative.

In the fifth instance the lever 32 is moved all the way to the rear, after having been placed in the extreme forward position, and no change in operation of the unit has resulted. Collar 31 has been moved forward, creating a space between collar 31 and the shift fork 24. In this position the spring 29 pulls ratchet 30 down in the operating position again, since rod 28 has been moved forward far enough for the end of ratchet 30 to be pulled down by spring 29, after having cleared shift collar 22.

This completes the cycle of operation that takes place when the control lever 32 is moved from the extreme rear position to the extreme forward position on the quadrant 34.

From the preceding description it is thought that the invention will be now understood, and also that the control mechanism illustrated in Figures 6 and 7 can be utilized for operating the anti-roll-back and free-wheeling device in both forms of the over-running clutch or free-wheeling units. The control mechanism, however, as well as other parts of the invention, are capable of alterations and changes such as would be within the range of equivalents and as would be within the scope and meaning of the appended claims.

What is claimed as new is:

1. An anti-roll-back and free-wheeling device for motor vehicles comprising the combination of an over-running clutch unit disposed on the main drive shaft and on the rear drive shaft of the vehicle transmission and adapted to operate as a free-wheeling unit, and an anti-roll-back over-running clutch unit adjacent the free-wheeling unit and disposed on the rear drive shaft of the vehicle and adapted to operate automatically as the anti-roll-back unit of the combination; means operable from the front of the vehicle for locking and unlocking said anti-roll-back unit to an operable or inoperable position when said anti-roll-back unit is desired or not desired; including adjustable safety means associated with said locking means for causing said anti-roll-back unit to slip in locked position on excessive loads.

2. An anti-roll-back and free-wheeling device for motor vehicles comprising the combination of an over-running clutch unit disposed on the main drive shaft and on the rear drive shaft of the vehicle transmission and adapted to operate as a free-wheeling unit, and an anti-roll-back over-running clutch unit adjacent the free-wheeling unit and disposed on the rear drive shaft of the vehicle, a disk brake mechanism associated therewith, the disk brake and over-running clutch adapted to operate automatically as the anti-roll-back unit of the combination; means for locking and unlocking the anti-roll-back unit, and adjustable safety means for causing the anti-roll-back unit to slip on excessive loads.

3. An anti-roll-back and free-wheeling device as claimed in claim 1, said anti-roll-back unit having its driving member keyed to the rear drive shaft and its driven member in floating position on said shaft and including roller members between the driving and driven members to lock the parts together on rotation of the shaft; said driven member including a gear for locking and unlocking the driven member to and from said means operable from the front of the vehicle.

4. An anti-roll-back and free-wheeling device as claimed in claim 2, said means for locking and unlocking said anti-roll-back unit being selective and having connection with said over-running clutch which provides free-wheeling and simultaneously permitting free-wheeling of the vehicle with the anti-roll-back locked or unlocked; said anti-roll-back unit operating in locked position to lock or engage the anti-roll-back unit to the casing housing the combination.

5. An anti-roll-back and free-wheeling device for motor vehicles comprising the combination of an over-running clutch disposed on the main drive shaft and on the rear drive shaft of the vehicle transmission and adapted to operate as a free-wheeling unit, and anti-roll-back over-running clutch unit adjacent the free-wheeling unit and disposed on the rear drive shaft of the vehicle, a disk brake mechanism associated therewith, the disk brake and over-running clutch combining as a unit and adapted to operate automatically as the anti-roll-back unit of the combination; means for locking and unlocking the anti-roll-back unit into and out of operable position independently of the gear shift lever of the vehicle, means associated with the gear shift lever of the vehicle for unlocking said anti-roll-back when the gear shift is put in reverse position and for permitting said anti-roll-back to become in operable position when the gear shift lever is not in reverse position; and adjustable safety means associated with said anti-roll-back for allowing the anti-roll-back to slip when in locked position as the load imposed is too great.

6. An anti-roll-back and free-wheeling device for motor vehicles as claimed in claim 5, wherein the means for operating the anti-roll-back unit is selective for various combinations of the operation of the vehicle whereby free-wheeling is combined with the anti-roll-back and the like.

7. In a back-stop mechanism for automobiles, the combination with a driving shaft, of a stationary member, and cooperating elements comprising a one-way clutch, a jaw clutch, and shock-absorbing means all interconnected and one connected to said driving shaft and another to said stationary member, whereby said shaft may rotate freely in one direction and is held against rotation in the opposite direction with said shock-absorbing means operative to yield against sudden heavy shocks upon tendency to rotation of the shaft in the last-mentioned direction.

8. In a back-stop mechanism for automobiles, the combination with a driving shaft, of a stationary member, a one-way clutch, a jaw clutch and shock-absorbing means all interconnected and one connected to said driving shaft and another to said stationary member, whereby said shaft may rotate freely in one direction and is yieldingly held against rotation in the opposite direction, and means to break at will the connection between said stationary member and said driving shaft to permit rotation of said driving shaft in both directions.

9. In a back-stop mechanism for automobiles, the combination with a driving shaft, of a stationary member, a roller clutch including two rotatable parts and rollers between them to permit relative rotation of said parts in one direction and prevent rotation in the opposite direction, one of said parts being connected to said shaft, a jaw clutch having two members, one connected to the other part of said roller clutch, and a friction clutch having a plurality of relatively movable frictionally engaging parts one of which is connected to the other part of said jaw clutch while the other part of said friction clutch is connected to said stationary member.

10. The mechanism set forth in claim 9, wherein said jaw clutch members are separable and with the addition of means for at will separating said jaw clutch members.

11. In a back-stop mechanism for automobiles, the combination with a driving shaft, of a casing, a roller clutch, a jaw clutch and a friction clutch all interconnected and one connected to said driving shaft and another to said casing, whereby said shaft may rotate freely in one direction and is held against rotation in the opposite direction, means for operating one of said clutches to break the connection between said casing and said driving shaft to permit rotation of said driving shaft in both directions, and means for releasably locking said one of said clutches with said connection broken between said driving shaft and said casing.

12. The mechanism set forth in claim 9, wherein said jaw clutch members are separable, and with the addition of means for at will separating said jaw clutch members, and means for releasably locking said jaw clutch members in separated relation.

13. The back-stop mechanism set forth in claim 7, with the addition of means for operating one of said elements, to break the connection between said stationary member and said driving shaft to permit rotation of said driving shaft in both directions, and means for releasably locking said one of said elements with said connection broken between said driving shaft and said stationary support.

14. The back-stop mechanism set forth in claim 7, wherein said one-way clutch, said jaw clutch and said shock-absorbing means are mounted coaxially with said driving shaft in encircling relation thereto.

15. In a back-stop mechanism for automobiles, the combination with a driving shaft, of a stationary member, and cooperating elements comprising a one-way clutch including a plurality of relatively rotatable members and means to permit relative rotation thereof in one direction and prevent such rotation in the opposite direction, a jaw clutch including a plurality of parts, a shock-absorbing means including a plurality of parts, said one-way clutch, jaw clutch and shock-absorbing means being connected together and to said shaft and said stationary member to permit rotation of said shaft in one direction and prevent rotation thereof in the opposite direction, means for operating the parts of one of said elements, to break the connection between said shaft and said stationary member and permit rotation of said shaft in both directions, and means for releasably locking said parts of said element with said connection broken between said shaft and said stationary member.

RAYMOND A. MORSE.